United States Patent
Rhee et al.

(10) Patent No.: US 6,808,779 B2
(45) Date of Patent: Oct. 26, 2004

(54) HIGH-DENSITY OPTICAL DISK WITH A POLYMER FILM FEATURING THERMOCHROMISM

(75) Inventors: Bum Ku Rhee, Kyunggi-do (KR); Kyung Chan Park, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 10/270,975

(22) Filed: Oct. 15, 2002

(65) Prior Publication Data

US 2003/0108758 A1 Jun. 12, 2003

(30) Foreign Application Priority Data

Oct. 15, 2001 (KR) ........................................ 2001-63491

(51) Int. Cl.[7] ................................................ B32B 3/02
(52) U.S. Cl. ..................... 428/64.1; 428/64.4; 428/913; 430/270.11; 430/495.1; 430/945; 369/283; 369/288
(58) Field of Search .............................. 428/64.1, 64.4, 428/913; 430/270.11, 495.1, 945; 369/283, 288

(56) References Cited

U.S. PATENT DOCUMENTS 5,631,056 A * 5/1997 Kawanishi et al. ......... 428/64.1
2003/0108709 A1 * 6/2003 Rhee te al. ................ 428/64.4

* cited by examiner

*Primary Examiner*—Elizabeth Mulvaney
(74) *Attorney, Agent, or Firm*—Lee, Hong, Degerman, Kang & Schmadeka

(57) ABSTRACT

The present invention relates to a high-density optical disk having thin film layer made from a thermochromic polymer with a red-shift which exhibits self-focusing and optical bleaching. After an incident light beam passes through the polymer medium, not only can the spot size of the beam be reduced but also transmittance can be enhanced due to these kinds of third-order nonlinear optical response. Thus, a high-density disk structured according to the present invention is capable of the signal reproduction resolution beyond the diffraction limit with an efficient reflectivity. Accordingly, data recording density of a high-density disk can be improved greatly.

20 Claims, 4 Drawing Sheets

HIGH-DENSITY OPTICAL DISK WITH A POLYMER FILM FEATURING THERMOCHROMISM

CROSS REFERENCE TO RELATED ART

Pursuant to 35 U.S.C. §119(a), this application claims the benefit of earlier filing date and right of priority to Korean Patent Application No. 2001-63491, filed on Oct. 15, 2001, the content of which is hereby incorporated by reference in its entirety.

BACKGROUND OF THE INVENTION

1. Field of the Invention

The present invention relates to a high-density (HD) optical disk having a thin film layer made from a thermochromic polymer with a red-shift which exhibits self-focusing and optical bleaching.

2. Description of the Related Art

In general, information signals in an optical disk such as a compact disk (CD) or a digital versatile disk (DVD) is recorded and reproduced with a laser beam incident thereto. The optical disk is classified into two types, one for a read-only optical disk such as a CD or DVD for read only memory (CD-ROM or DVD-ROM), and the other for a rewritable optical disk such as a rewritable CD (CD-R/W) or a DVD for random access memory (DVD-RAM).

FIG. 1 shows a schematic structure of a conventional optical disk 5 which has a transmission layer 10, a reflection layer 11 above the transmission layer 10, and a protective layer 12 above the reflection layer 11. Pits and/or spaces for the recorded signals, which form a recording layer, have been formed on the surface of the reflection layer 11. In order to record or reproduce data to and/or from the optical disk, a laser beam passing through the transmission layer 10 is focused on the reflection layer 11 by the objective lens. Thus the signal reproduction resolution and density of recorded information are limited to the size of a beam spot at the focal position.

However, it is not possible to make the size of the beam spot, which is focused on the recording layer 11 of the optical disk, to be smaller than the wavelength of the laser beam because of optical restriction posed by the diffraction limit of the laser beam. Presently, for a HD optical disk, the size of a beam spot can only be minimized by using a blue laser having shorter wavelength.

An example of where a smaller size of a beam spot is required can be found in recording the broadcast of HD-grade television signals for longer periods of time, such as two hours. In this case, the track pitch on the recording layer of the optical disk needs to be relatively narrower in order to accommodate the complete transmission. Consequently, not only does the size of a beam spot that is focused on the recording surface need to be minimized, but also the optical efficiency of the laser beam that is reflected from that surface needs to be maximized. Unfortunately, effective solutions for situations such as this example are not available presently and are urgently required.

Currently, as an effort to overcome the diffraction limit of a light source, U.S. Pat. No. 5,615,206 issued to Yanasigawa, et. al., proposes that a HD optical disk be manufactured with a reflective thin film made of amorphous silicon, which exhibits a non-linear effect. However, this invention has not been commercialized because the amorphous silicon film excessively absorbs light energy in the wavelength region of visible light.

SUMMARY OF THE INVENTION

Accordingly, it is an object of the present invention to provide a HD optical disk that substantially obviates one or more of the problems due to limitations and disadvantages of the related art.

An object of the present invention is to provide a HD optical disk that is capable of a signal reproduction resolution beyond the diffraction limit of the laser beam by coating an additional polymer film, which features thermochromism with a red-shift, over the recording surface.

Another object of the present invention is to provide a polymer film that exhibits third-order optical nonlinearities. These third-order optical nonlinearities include self-focusing or self-defocusing in the refractive aspect and optical bleaching or saturation in the absorptive aspect, depending on material. In particular, self-focusing reduces the size of beam spot due to the intensity-dependent positive refractive change, while optical bleaching enhances the intensity of transmitted beam due to a lowered extinction coefficient beyond linear optical properties. Since a thermochromic polymer with a red-shift can be shown to have both the properties of self-focusing and optical bleaching at a specific frequency of irradiated beam as explained in detailed description, not only can the size of a beam spot focused on the recording surface be minimized but also the optical efficiency of a light beam reflected from the recording surface can be maximized after a light beam travels in this medium.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a recordable disk medium for use with a light source comprises a transmission layer; a reflection layer; a protective layer; and a polymer film having thermochromism disposed coplanarly with the reflection layer in an incident light beam path of the light source wherein the polymer film refracts an incident light beam beyond a diffraction limit of the incident light beam and allows the formation of a smaller laser beam spot on the reflection layer.

According to one aspect of the present invention, the polymer film has a red-shift characteristic. Preferably, the polymer film is disposed between the transmission layer and the reflection layer. Alternatively, the transmission layer is disposed between the polymer film and the reflection layer.

According to another aspect of the present invention, the polymer film comprises poly (3-tetradecylthiophene)-co-(3-(4-trifluoromethyl-phenyl)thiophene). The polymer film with thermochromism has a refractive coefficient that increases and an extinction coefficient that decreases in response increased in temperature caused by absorbing energy from the incident light beam.

According to another aspect of the present invention, the polymer film refracts the incident light beam and allows the formation of a Gaussian beam spot at a light intensity between about 10 $kW/cm^2$ and 20 $kW/cm^2$.

The disk medium described below is used with a recording and reproduction apparatus. Such apparatus comprises a light source that provides an incident light beam on the disk medium. In particular, the disk medium comprises a transmission layer; a reflection layer; a protective layer; and a polymer film having thermochromism disposed coplanarly with the reflection layer in an incident light beam path of the light source wherein the polymer film refracts the incident light beam beyond a diffraction limit of the incident light beam and allows the formation of a smaller laser beam spot on the reflection layer.

It is to be understood that both the foregoing general description and the following detailed description are exemplary and explanatory and are intended to provide a further explanation of the invention as claimed. Additional features and advantages of the invention, which may be embodied in other specific forms without departing from the sprit or essential characteristics thereof, will be set forth in the description which follows, and in part will be apparent from the description, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFFERRED EMBODIMENT

In order that the invention may be fully understood, a preferred embodiment thereof will now be described with reference to the accompanying drawings.

Figure 1:
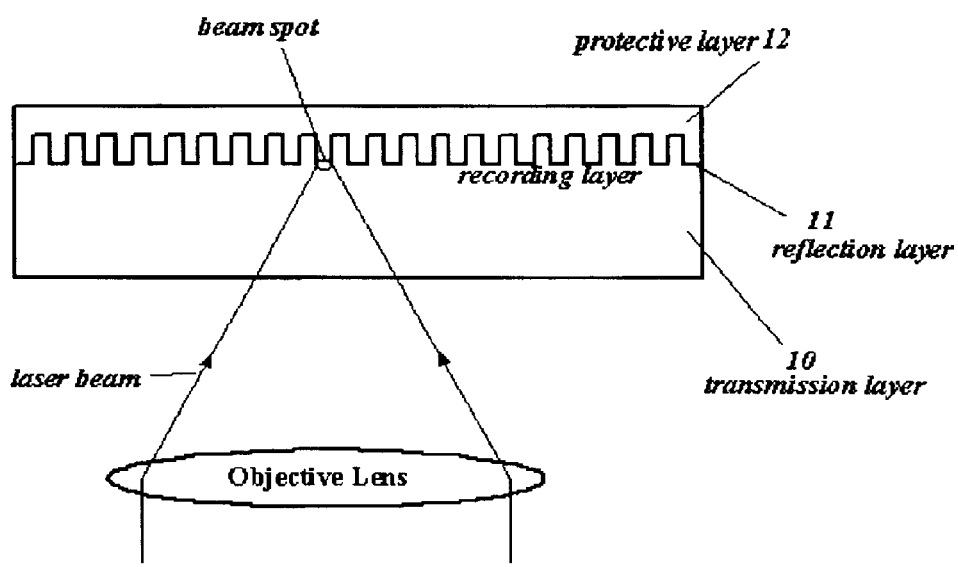
FIG. 1 shows the schematic structure of a conventional optical disk.
Figure 2:
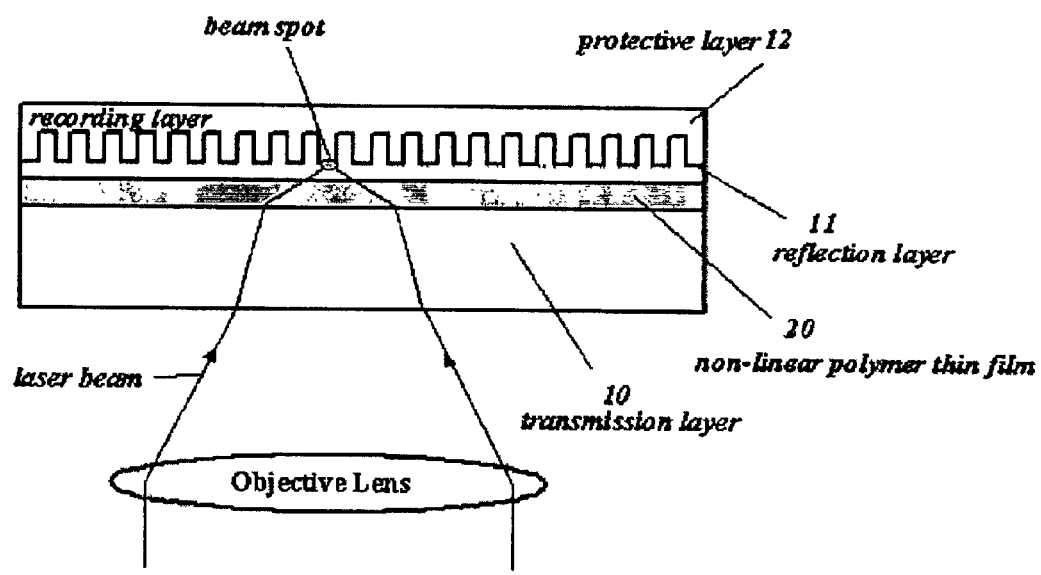
FIG. 2 shows the schematic structure of a high-density optical disk according to the preferred embodiment of the present invention.

FIG. 1 shows a schematic structure of a conventional optical disk which has a transmission layer 10 as a substrate, a reflection layer 11 formed above the transmission layer 10, and a protective layer 12 coated onto the reflection layer 11. FIG. 2 shows a schematic structure of a HD optical disk according to the present invention. The optical disk of FIG. 2 is the same as the conventional one of FIG. 1, except a nonlinear polymer film 20, which exhibits self-focusing and optical bleaching properties, is disposed between the transmission layer 10 and the reflection layer 11. Consequently, a recording layer can support pits and/or spaces situated more closely together for recorded signals than those in a conventional HD optical disk. In an alternative embodiment, the nonlinear polymer film 20 may be disposed below the transmission layer 10.

The third-order optical nonlinearity of the polymer film 20 induces light-intensity-dependent optical constants, i.e., a nonlinear refractive index ($n_2$) and a nonlinear extinction coefficient ($\kappa_2$). The quantitative relation between the third order susceptibility and nonlinear optical constants is given by $$1+4\pi\chi^{(1)}+4\pi\chi^{(3)}|E|^2=[n_0+n_2I+i(\kappa_0+\kappa_2I)]^2 \quad \text{(Eq. 1)}$$

where $\chi^{(1)}$, $\chi^{(3)}$, $n_0$, $\kappa_0$, E and I are the linear susceptibility, the third order nonlinear susceptibility, linear refractive index, linear extinction coefficient, electric field and light intensity within the polymer film 20, respectively. The sign and magnitude of $n_2$ and $\kappa_2$ depend on the material properties of the polymer film 20.

Figure 3:
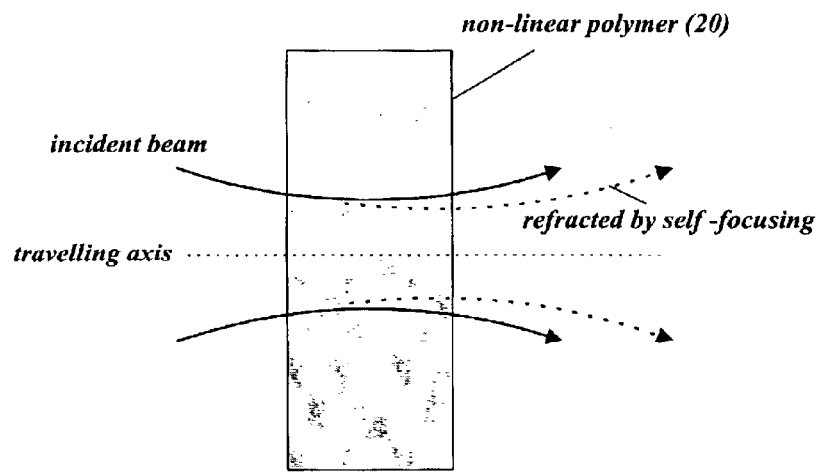
FIG. 3 illustrates the characteristic of self-focusing by a non-linear thin film formed in a high-density optical disk according to the preferred embodiment of the present invention.
Figure 4:
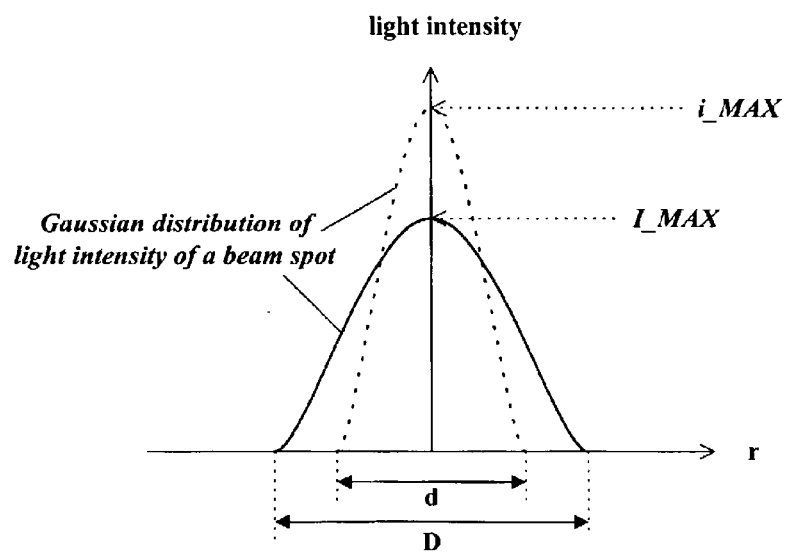
FIG. 4 shows a comparative Gaussian distribution of light intensity of a beam spot focused by a non-linear thin film formed in a high-density optical disk according to the preferred embodiment of the present invention.

If $n_2$ is positive, the reflective index increases with increasing optical intensity. As a result of this nonlinear response, the refractive index of the material is larger at the center of the laser beam than it is at the laser beam's periphery. Consequently, the polymer film 20 is in effect turned into a positive lens, leading to a self-focusing of a beam as shown in FIG. 3. On the other hand, if $\kappa_2$ is negative, opacity decreases with increasing optical intensity because the extinction coefficient becomes smaller below $\kappa_0$. Therefore, the diameter of a beam spot focused on the recording layer 13 passing through a polymer film 20 with a positive $n_2$ and a negative $\kappa_2$ can be relatively smaller than on the recording surface of a conventional HD optical disk. In addition, the maximum light intensity of a beam spot with the smaller diameter d, "i_MAX," can be stronger than the maximum light intensity of beam spot with a larger diameter D, "I_MAX," without a nonlinear response, as shown in FIG. 4. This phenomenon is due to a decrease of the extinction coefficient, which is dependent on the light intensity, as well as the effect of self-focusing.

Thermochromism is defined as the reversible phenomena of temperature induced color change. If the optical absorption spectrum of a polymer moves to the longer (or shorter) wavelength side as temperature increases, it is called a thermochromic polymer with a red (or blue)-shift.

Figure 5:
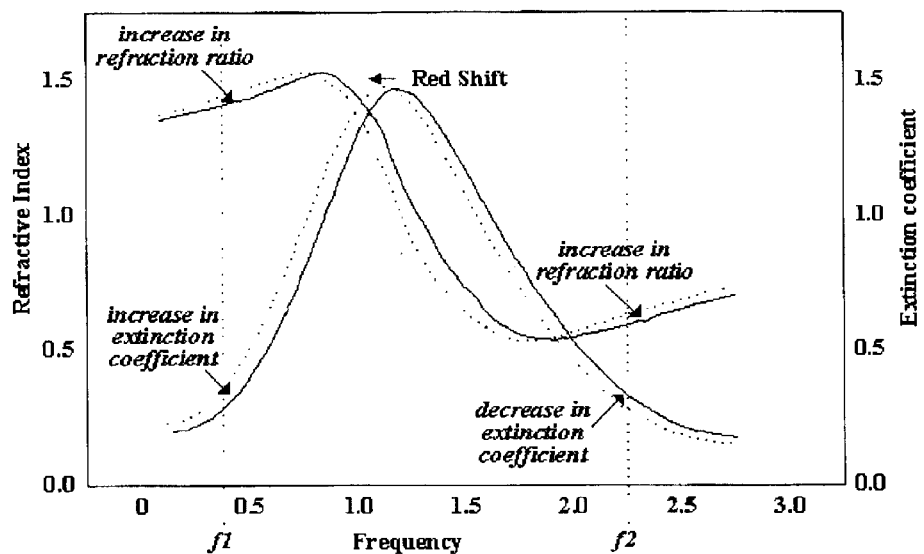
FIG. 5 shows changes of a refractive index and an extinction coefficient due to an increase in temperature of a thermochromic polymer with a red-shift (the solid and dotted curves are at room temperature and higher temperature, respectively)

If the laser beam is irradiated on the thermochromic polymer film 20 with a red-shift, the temperature of polymer film 20 increases due to light energy absorption along with the linear extinction coefficient, $\kappa_0$. As a result, the curves of both the refractive index and the absorption spectrum move simultaneously toward the lower frequency side, as illustrated in FIG. 5. Here, the solid curves and dotted curves are at room temperature and higher temperature, respectively. It is clearly understood that both the refractive index and the extinction coefficient increase at the frequency "ƒ1" as temperature increases as shown in FIG. 5. On the other hand, at the frequency "ƒ2", the refractive index increases but the extinction coefficient decreases so that the desired condition of a positive $n_2$ and a negative $\kappa_2$ can be created for a thermochromic polymer 20 with a red-shift. An example of a non-linear polymer 20 with a positive $n_2$ and a negative $\kappa_2$ is poly (3-tetradecylthiophene)-co-(3-(4-trifluoromethyphenyl)thiophene) [P(TDT_TFPT)].

Figure 6:
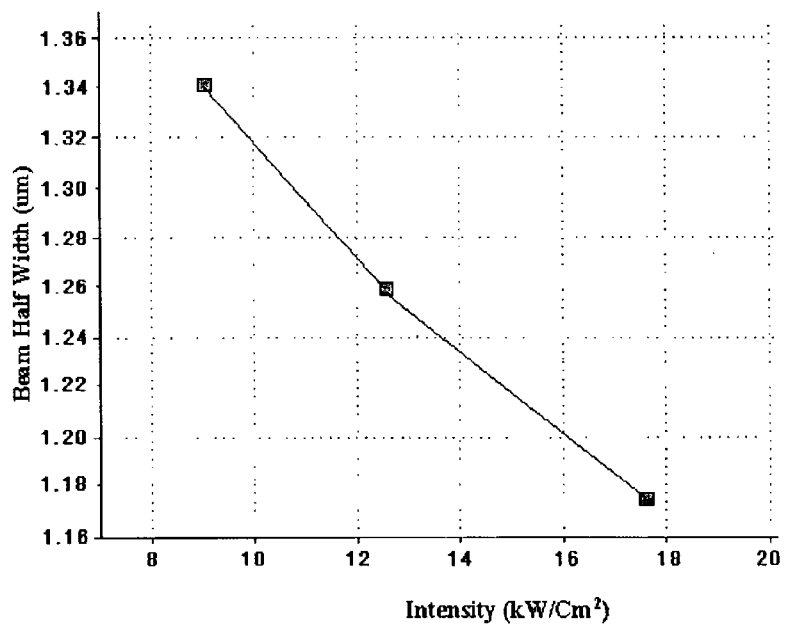
FIG. 6 shows an experimental graph of radius of a beam spot vs. light intensity incident to a thin film of the polymer P(TDT_TFPT) according to the preferred embodiment of the present invention.

It has been experimentally verified that the radius of a Gaussian beam spot decreases near the diffraction limit, as shown in FIG. 6, until light intensity approaches 20 kW/cm² for a thin film of the polymer P(TDT_TFPP) featuring a thermochromism with a red-shift. Therefore, if the nonlinear thin film of a thermochromic polymer 20 with a red-shift is coated over the reflection layer 11 of a HD optical disk as described above, a smaller beam spot beyond the diffraction limit of the laser beam can be achieved. Since self-focusing and the optical efficiency of the laser beam reflected from the recording surface can be maximized at a specific frequency of light, the beam's resolution increases. As a result, the pitch of a spiral track (the pits and/or spaces) formed on the reflective layer of a high-density optical disk can be also narrower. Accordingly, the recording density of a high-density optical disk is substantially improved.

The HD optical disk structured according to the present invention improves data recording density greatly owing to a thermochromic polymer with a red-shift in which a refractive coefficient increases whereas an extinction coefficient decreases at a specific frequency due to increase in temperature arising from light energy absorption.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A high-density disk recording medium, comprising:
   a transmission layer;
   a reflection layer;
   a protective layer; and
   a polymer film featuring thermochromism with a red-shift and situated adjacently to the transmission layer, wherein the polymer film refracts an incident light beam beyond diffraction limit of the incident light beam and allows the formation of a smaller laser beam spot on the reflective layer.

2. The medium of claim 1, wherein the polymer film is disposed between the transmission layer and the reflection layer.

3. The medium of claim 1, wherein the transmission layer is disposed between the polymer film and the reflection layer.

4. The medium of claim 1, wherein the polymer film comprises poly (3-tetradecylthiophene)-co-(3-(4-trifluoromethyl-phenyl)thiophene).

5. The medium of claim 1, wherein the polymer film has a thermochromism with a red-shift in which a refractive coefficient increases and an extinction coefficient decreases at a specific frequency due to an increase in temperature arising from light energy absorption.

6. The medium of claim 5, wherein the polymer film refracts an incident light beam and allows the formation of a Gaussian beam spot at a light intensity between about 10 kW/cm$^2$ and 20 kW/cm$^2$.

7. A recordable disk medium for use with a light source, the medium comprising:
   a transmission layer;
   a reflection layer;
   a protective layer; and
   a polymer film featuring thermochromism and disposed coplanarly with the reflection layer in an incident light beam path of the light source wherein the polymer film refracts an incident light beam beyond a diffraction limit of the incident light beam and allows the formation of a smaller laser beam spot on the reflection layer.

8. The recordable disk medium of claim 7, wherein the polymer film has a red-shift characteristic.

9. The recordable disk medium of claim 7, wherein the polymer film is disposed between the transmission layer and the reflection layer.

10. The recordable disk medium of claim 7, wherein the transmission layer is disposed between the polymer film and the reflection layer.

11. The recordable disk medium of claim 7, wherein the polymer film comprises poly (3-tetradecylthiophene)-co-(3-(4-trifluoromethyl-phenyl)thiophene).

12. The recordable disk medium of claim 7, wherein the polymer film with thermochromism has a refractive coefficient that increases and an extinction coefficient that decreases in response increased in temperature caused by absorbing energy from the incident light beam.

13. The recordable disk medium of claim 12, wherein the polymer film refracts the incident light beam and allows the formation of a Gaussian beam spot at a light intensity between about 10 kW/cm$^2$ and 20 kW/cm$^2$.

14. A recording and reproduction apparatus for use with a disk medium, the apparatus comprising:
   a light source that provide an incident light beam on the disk medium;
   the disk medium comprising:
      a transmission layer;
      a reflection layer;
      a protective layer; and
      a polymer film having thermochromism disposed coplanarly with the reflection layer in an incident light beam path of the light source wherein the polymer film refracts the incident light beam beyond a diffraction limit of the incident light beam and allows the formation of a smaller laser beam spot on the reflection layer.

15. The apparatus of claim 14, wherein the polymer film has a red-shift characteristic.

16. The apparatus of claim 14, wherein the polymer film is disposed between the transmission layer and the reflection layer.

17. The apparatus of claim 14, wherein the transmission layer is disposed between the polymer film and the reflection layer.

18. The apparatus of claim 14, wherein the polymer film comprises poly (3-tetradecylthiophene)-co-(3-(4-trifluoromethyl-phenyl)thiophene).

19. The apparatus of claim 14, wherein the polymer film with thermochromism has a refractive coefficient that increases and an extinction coefficient that decreases in response increased in temperature caused by absorbing energy from the incident light beam.

20. The apparatus of claim 19, wherein the polymer film refracts the incident light beam and allows the formation of a Gaussian beam spot at a light intensity between about 10 kW/cm$^2$ and 20 kW/cm$^2$.

* * * * *